US010831641B2

(12) United States Patent
Mahimkar

(10) Patent No.: US 10,831,641 B2
(45) Date of Patent: Nov. 10, 2020

(54) METHOD AND APPARATUS FOR DETERMINING A PERFORMANCE IMPACT BY A SOFTWARE UPGRADE OF A MOBILE USER ENDPOINT DEVICE

(71) Applicant: AT&T Intellectual Property I, L.P., Atlanta, GA (US)

(72) Inventor: Ajay Mahimkar, Woodbridge, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 216 days.

(21) Appl. No.: 15/259,443

(22) Filed: Sep. 8, 2016

(65) Prior Publication Data

US 2018/0067841 A1    Mar. 8, 2018

(51) Int. Cl.
| | |
|---|---|
| *G06F 11/36* | (2006.01) |
| *G06F 8/65* | (2018.01) |
| *G06F 11/34* | (2006.01) |
| *H04W 24/02* | (2009.01) |

(52) U.S. Cl.
CPC .......... *G06F 11/3668* (2013.01); *G06F 8/65* (2013.01); *G06F 11/34* (2013.01); *G06F 11/3409* (2013.01); *H04W 24/02* (2013.01); *G06F 11/3447* (2013.01)

(58) Field of Classification Search
CPC .................................... G06F 8/61; G06F 8/65
USPC ........................................................ 717/168
See application file for complete search history.

(56) References Cited

U.S. PATENT DOCUMENTS

| | | | |
|---|---|---|---|
| 6,052,584 A | * | 4/2000 | Harvey ............. H04W 24/00 455/423 |
| 6,742,141 B1 | | 5/2004 | Miller |
| 6,970,924 B1 | | 11/2005 | Chu et al. |
| 7,269,824 B2 | | 9/2007 | Noy et al. |

(Continued)

FOREIGN PATENT DOCUMENTS

| | | |
|---|---|---|
| AU | 4355400 A | 12/2000 |
| CA | 2428599 A1 | 5/2002 |

(Continued)

OTHER PUBLICATIONS

Mao, Yun, "Automated Computer System Diagnosis by machine Learning Approaches", Technical report, UPenn CIS Dept., 2005, CiteSeerx10M, pp. 1-31.

(Continued)

*Primary Examiner* — Wei Y Zhen
*Assistant Examiner* — Binh Luu

(57) ABSTRACT

A method and apparatus for determining the impact of a software upgrade on a service performance are disclosed. The method obtains call detail records associated with a plurality of mobile user endpoint devices, aggregates each mobile user endpoint device into at least one group, maps each mobile user endpoint device to at least one first aggregate, wherein each aggregate of the at least one first aggregate comprises at least one of: a group established based on the type of each of the mobile user endpoint devices, a group established based on the make of each of the mobile user endpoint devices, or a group established based on the model of each of the mobile user endpoint devices, and identifies a nearest co-occurring software upgrade when a change in a service performance in the communications network is detected based on the at least one first aggregate.

20 Claims, 8 Drawing Sheets

(56) References Cited

U.S. PATENT DOCUMENTS

| | | | |
|---|---|---|---|
| 7,385,924 | B1 | 6/2008 | Riddle |
| 7,475,130 | B2 | 1/2009 | Silverman |
| 7,490,073 | B1 | 2/2009 | Qureshi et al. |
| 7,542,429 | B2 | 6/2009 | Boss et al. |
| 7,840,854 | B2 | 11/2010 | Zhou |
| 8,032,865 | B2 | 10/2011 | Rajaram |
| 8,103,664 | B2 | 1/2012 | Hooks |
| 8,140,899 | B2 | 3/2012 | Ren et al. |
| 8,166,544 | B2 | 4/2012 | Memon et al. |
| 8,418,150 | B2 | 4/2013 | Thirumalai et al. |
| 8,839,047 | B2 | 9/2014 | Gyorffy |
| 8,887,148 | B1 | 11/2014 | Kiaie et al. |
| 8,959,504 | B2 | 2/2015 | Shen et al. |
| 8,996,916 | B2 * | 3/2015 | Huang .............. G06F 11/0748 714/27 |
| 9,438,491 | B1 * | 9/2016 | Kwok ................ H04L 43/065 |
| 2006/0236325 | A1 * | 10/2006 | Rao .................. H04L 67/34 719/315 |
| 2009/0163183 | A1 * | 6/2009 | O'Donoghue ........ G06Q 30/02 455/414.1 |
| 2009/0203352 | A1 * | 8/2009 | Fordon ............... H04M 15/00 455/406 |
| 2012/0069747 | A1 * | 3/2012 | Wang ................. H04L 41/082 370/252 |
| 2013/0018803 | A1 | 1/2013 | Challu |
| 2014/0317734 | A1 * | 10/2014 | Valencia ............. G06F 21/316 726/22 |
| 2014/0351412 | A1 * | 11/2014 | Elisha ............... H04L 41/0806 709/224 |
| 2015/0082097 | A1 * | 3/2015 | Brewer .............. G06F 11/3409 714/47.1 |
| 2015/0356451 | A1 * | 12/2015 | Gupta ................ G06F 21/552 706/52 |
| 2016/0135067 | A1 * | 5/2016 | Morad ................ H04M 15/58 455/423 |
| 2016/0218942 | A1 | 7/2016 | Choquette et al. |
| 2017/0006135 | A1 * | 1/2017 | Siebel .................. H04L 69/16 |
| 2017/0019291 | A1 * | 1/2017 | Tapia ................ H04L 41/5067 |

FOREIGN PATENT DOCUMENTS

| | | |
|---|---|---|
| CA | 2612703 A1 | 2/2009 |
| WO | WO 2010/027873 A1 | 11/2010 |

OTHER PUBLICATIONS

Pertet et al., "Causes-of-Failure-in-Web-Applications-CMU-PDL-05-109", Parallel Data Laboratory, Dec. 2005, pp. 1-20.

Gill et al., "Understanding Network Failures in Data Centers: Measurement, Analysis, and Implications", ACM SIGCOMM Computer Communication Review, vol. 41, No. 4, ACM, Aug. 15-19, 2011, pp. 1-12.

Han et al. "Sensor Network Software Update Management: A Survey", International Journal of Network Management, 2005, pp. 283-294.

Wool, Avishai, "A Quantative Study of Firewall Configuration Errors", Computer, 2004, pp. 62-67.

Ludwig et al., Good Network Updates for bad packets: Waypoint enforcement beyond destination-based routing policies, Proceedings of the 13$^{th}$ ACM Workshop on Hot Topics in Networks, ACM 2014, pp. 1-7.

* cited by examiner

METHOD AND APPARATUS FOR DETERMINING A PERFORMANCE IMPACT BY A SOFTWARE UPGRADE OF A MOBILE USER ENDPOINT DEVICE

The present disclosure relates to a method and apparatus for determining a performance impact by a software upgrade of a mobile user endpoint device, e.g., determining the impact to a service provided by a wireless communications network of a network service provider.

BACKGROUND

As ever greater number of wireless endpoint devices are used for accessing various types of services, e.g., voice services, data services, streaming services, gaming services, etc., new capabilities and improvements to existing capabilities continue to be introduced on these mobile user endpoint devices. Manufacturers of the wireless user endpoint devices may provide any number of software upgrades to support existing capabilities and new capabilities that are being introduced. In one example, a software upgrade that is provided by a manufacturer may be for providing an improved user experience with a type of service that is accessed by a user via a mobile user endpoint device manufactured by the manufacturer. In another example, the software upgrade may be for enabling the user to access new services or new features on existing services. It is often quite difficult to ascertain the true impact of such software upgrades when deployed in a very large scale, e.g., across the wireless communications network of a network service provider.

SUMMARY OF THE DISCLOSURE

In one embodiment, the present disclosure teaches a method and apparatus for determining an impact of a software upgrade to a network connected user endpoint device on a service via a communications network. For example, the method obtains call detail records associated with a plurality of mobile user endpoint devices, aggregates each mobile user endpoint device of the plurality of mobile user endpoint devices into at least one group, wherein each group of the at least one group is established based on at least one of: a type of each mobile user endpoint device, a make of each mobile user endpoint device, a model of each mobile user endpoint device, or a version of a software deployed on each mobile user endpoint device, wherein the type, the make, the model, and the version of the software are obtained from a respective call detail record associated with each mobile user endpoint device, maps each mobile user endpoint device of the plurality of mobile user endpoint devices to at least one first aggregate, wherein each aggregate of the at least one first aggregate comprises at least one of: a group established based on the type of each of the mobile user endpoint devices, a group established based on the make of each of the mobile user endpoint devices, or a group established based on the model of each of the mobile user endpoint devices, identifies a nearest co-occurring software upgrade when a change in a service performance in the communications network is detected based on the at least one first aggregate, and determines that the nearest co-occurring software upgrade is a cause for the change in the service performance that is detected.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure relates to a method and apparatus for determining an impact of a software upgrade of a mobile user endpoint device on a service provided by a wireless communications network, e.g., a wireless communications network of a network service provider. The teachings of the present disclosure may be applied for any type of wireless communications network, e.g., a Long Term Evolution (LTE) network, a 5G network, etc.

Figure 1:
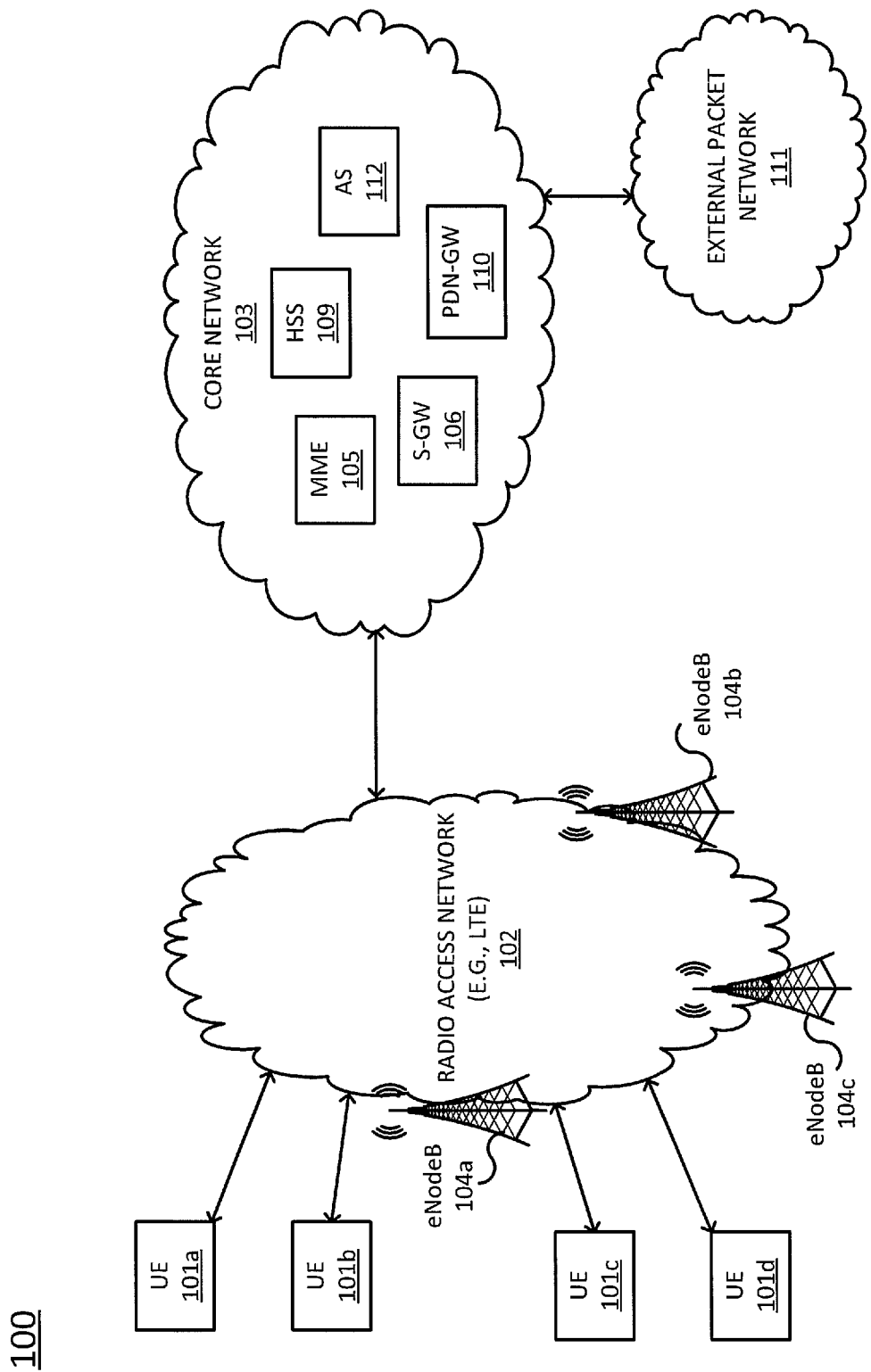
FIG. 1 illustrates an example network related to the present disclosure.

FIG. 1 illustrates an example network 100 related to the present disclosure. In one illustrative embodiment, the network 100 may comprise wireless User Endpoint (UE) devices 101a-101d, radio access network 102, and a core network 103.

The wireless UE devices 101a-101d may comprise any appropriate type of wireless user equipment, e.g., a mobile phone, a cellular phone, a computing tablet, a smart phone, a mobile router, a mobile vehicle (e.g., a wirelessly connected vehicle) such as a car, a boat or an airplane with wireless service capability, and the like. In one embodiment, the mobile UE device may be a smart phone used for performing various services (e.g., voice call services, data services, texting services, multimedia streaming services, Internet access services, and so on). It is to be understood that the mobile UE devices depicted in FIG. 1 are only examples and not intended to be limiting.

The radio access network 102 may comprise cellular or other wireless technologies, e.g., Wi-Fi networks, 2G networks, 3G networks, LTE networks, 5G networks, and the like. The core network 103 may comprise any type of communications network, such as for example, a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, or any other types of wireless core networks. It should be noted that an IP network is broadly defined as a network that uses Internet Protocol to exchange data packets.

In one embodiment, the core network 103 comprises an Evolved Packet Core (EPC). In one embodiment, the radio access network 102 comprises an LTE access network. In one embodiment, the LTE access network 102 comprises eNodeBs 104a-104c. The eNodeBs 104a-104c are used for providing wireless connectivity to mobile UE devices 101a-101d.

In one embodiment, the core network 103 comprises a Mobility Management Entity (MME) 105, a Serving Gateway (S-GW) 106, a Home Subscriber Server (HSS) 109, a Packet Data Network (PDN) Gateway (PDN-GW) 110, and an application server 112.

The MME 105 is responsible for control plane functionalities, e.g., paging, roaming, handover, tracking, allocation of resources, etc. For example, the MME 105 may be responsible for authenticating the mobile UE through the HSS, e.g., HSS 109, for paging a mobile UE, e.g., a mobile UE 101a, 101b, 101c or 101d, for bearer activation and deactivation, for choosing an S-GW, e.g., the S-GW 106, during an initial attachment, for choosing an S-GW during an intra-LTE handover that involves the core network 103, for mobility between an LTE and another radio access network, e.g., a 2G/3G cellular network, and the like.

The S-GW 106 serves as the mobility anchor for the user plane and is responsible for routing user data packets. In addition, the S-GW 106 terminates downlink data paths and triggers paging when downlink data arrives while the mobile UE is in idle state. For example, the S-GW 106 may be tasked with maintaining a data path between a PDN-GW, e.g., PDN-GW 110, and an eNodeB 104a, 104b or 104c, that is serving a mobile UE 101a, 101b, 101c or 101d.

The HSS 109 is a server that provides subscription and user related data. HSS 109 also provides user authentication and authorization. The PDN-GW 110 is responsible for providing connectivity to external packet data networks, e.g., external packet network 111 and the like.

It should be noted that the network 100 may include additional networks and/or elements that are not shown to simplify FIG. 1. For example, the radio access network and the core network of FIG. 1 may include additional network elements (not shown), such as for example, base stations, border elements, gateways, firewalls, routers, switches, call control elements, various application servers, and the like. In addition, various types of data may be stored in any number of databases. For instance, various databases, e.g., a database for call detail records, a database for storing a list of mobile user endpoint devices, a database for storing groups and/or aggregates to which a mobile user endpoint device may be mapped, etc., may be provided. In addition, the various types of data may also be stored in a cloud storage. In other words, the network service provider may implement the method for determining a performance impact by a software upgrade of a mobile user endpoint device of the present disclosure by storing data in a cloud storage and/or a centralized server.

As described above, a software upgrade may be provided for improving a user experience, for improving security, for improving the performance of the mobile UE itself (e.g., improving battery life), for enabling users to access new services, and/or for enabling users to access new features on existing services. However, the software upgrade may bring about a change in a service, e.g., impacting the performance of a service. It is important to note that the "change in service" is a change in regards to a performance associated with a service, e.g., a rate of blocked calls, the number of dropped packets, an amount of status messages communicated, incurred delay and the like. For clarity, the "change in service" of the present disclosure may be referred to as a change in the service performance. In one example, the software upgrade may be a cause for the change in the service performance. In another example, the software upgrade may not be the cause for the change in the service performance and may be coinciding with the software upgrade purely by chance. Thus, the change in the service performance that is observed may or may not be attributable to the software upgrade.

In one embodiment, the present disclosure describes a method and an apparatus for determining an impact of a software upgrade of a mobile user endpoint device on a service performance. For example, the service performance and the software upgrade are determined based on data obtained from call detail records of mobile user endpoint devices. Thus, the method first obtains call detail records of a plurality of mobile user endpoint devices. A call detail record of a mobile user endpoint device that is obtained may include a record of a session, e.g., a session for a voice or data service, accessed via the mobile user endpoint device. The call details records of the mobile user endpoint devices may be obtained from various network devices, e.g., servers, routers, or switches of a network service provider. For example, for data sessions, the call detail records may be obtained from session gateway servers. Similarly, for voice sessions, the call detail records may be obtained from mobile switching centers.

In one embodiment, the call detail records may be obtained in a predetermined interval, e.g., every 15 minutes, every hour, every 24 hours, etc. In one embodiment, the predetermined time interval for obtaining the call detail records is determined by the network service provider to meet the requirements of a particular implementation.

The method may then parse the call detail records that are obtained. The parsing is performed to obtain at least one attribute of a mobile user endpoint device of the call detail record and at least one call statistic. In one embodiment, the call statistic may comprise data related to a service performance. In one embodiment, the data related to the service performance may be for indicating a failed connection attempt (e.g., for a blocked call) or a status of termination. In one embodiment, the status of termination may be for indicating whether the termination was triggered by a user or induced by a network, e.g., a radio access network to which the mobile user endpoint device is attached or a core network from which a user accesses a service, e.g., a data service, a voice service, a video service, etc. For example, the status of termination may indicate that a network device, e.g., a router, of a radio access network (e.g., a 2G, 3G or 4G network) triggered the termination. In another example, the status of termination may indicate that a user terminated a data session.

In one embodiment, the data related to the service performance may comprise a ratio of a number of dropped voice calls in a radio access network to a number of successfully terminated calls in the radio access network. For example, the data related to the service performance may be for calls dropped due to an issue in the radio access network. In one embodiment, the data related to the service performance may comprise a ratio of a number of dropped voice calls in a non-radio access network to a number of successfully terminated calls in the radio access network. For example, the data related to the service performance may be for calls dropped due to an issue in the core network. In one embodiment, the data related to the service performance may comprise a ratio of a number of calls on a Universal Mobile Telecommunications Service (UMTS)

network and a Global System for Mobile (GSM) communication network to a number of calls on all radio access networks. In one embodiment, the data related to the service performance may comprise a ratio of time spent for all data and voice sessions on UMTS and GSM networks to the time spent for all data and voice sessions on all radio access networks. In one embodiment, the data related to the service performance may comprise other performance metrics defined by the network service provider. For example, data related to throughput, latency, lost packets, etc., may be defined as the data related to the service performance.

The attribute of the mobile user endpoint device may comprise an International Mobile Equipment Identity (IMEI). The IMEI is a code that uniquely identifies mobile user endpoint devices. For example, the mobile user endpoint device may be a smartphone. The IMEI contains a portion that is used to represent a Type Allocation Code (TAC) of the mobile user endpoint device. The TAC may be used to represent the Type, Make and Model of the mobile user endpoint device, as described below. In addition, the IMEI contains a portion for representing a version of software installed in the mobile user endpoint device, as described below. In other words, the IMEI of a mobile user endpoint device comprises a type of network to which the mobile user endpoint device attaches, a make of the mobile user endpoint device, a model of the mobile user endpoint device, and a version of software installed in the mobile user endpoint device. The IMEI codes are stored in the mobile user endpoint device. In other words, for mobile user endpoint devices with Subscriber Identity Module (SIM) cards, moving the SIM card from one mobile user endpoint device to another mobile user endpoint device does not move the IMEI code to the new mobile user endpoint device.

The type may be used to indicate a type of network to which the mobile user endpoint device is attached. For example, the type may indicate 2G, 3G, 4G/LTE, and the like. The make may indicate a manufacturer of the mobile user endpoint device. For example, the make of a mobile user endpoint device may indicate, Apple® Inc., Samsung®, Microsoft®, Motorola®, and the like. The model may be used to delineate a particular model of a mobile user endpoint device within the make. For example, for a mobile user endpoint device made by Apple, the model may indicate whether the mobile user endpoint device is an iPhone6, iPhone6S, and the like. Similarly, for a mobile user endpoint device made by Samsung, the model may indicate whether the mobile user endpoint device is a Galaxy S5, Galaxy S6, Galaxy S6 Edge, and the like.

The version of software may be used to indicate a version of an Operating System (OS) installed in a mobile user endpoint device. For example, a mobile user endpoint device manufactured by Apple may run on a mobile operating system of Apple referred to as an iPhone Operating System (iOS). For instance, an iPhone6 may be running on iOS version 9.1, iOS version 9.2, etc. Similarly, a mobile user endpoint device of Samsung may run on an Android operating system, e.g., Android 5.0. Android 5.0 may also be referred to as "Lollipop."

Once the call detail records are parsed, the method may aggregate (i.e., map) the plurality of mobile user endpoint devices into at least one group that is established for assessing a service performance. In one embodiment, the method aggregates the mobile user endpoint devices into these groups in accordance with a predefined hierarchy. The predefined hierarchy may comprise at least one of: a group based on a type, a group based on a make, a group based on a model, and a group based on a version of software.

In one embodiment, the network service provider determines the types of groups to be established and the service performances to be assessed for each type of group that is established. For example, the network service provider may assess the service performance based on a make of a mobile user endpoint device. In another example, the network service provider may assess the service performance based on a model of a mobile user endpoint device. In yet another example, the network service provider may assess the service performance based on a version of software (e.g., an operating system software) installed in a mobile user endpoint device. In yet another example, the network service provider may assess the service performance based on a type of network (e.g., 2G, 3G, 4G network, etc.) through which the mobile user endpoint device accesses various services. To illustrate by way of an example, for each call detail record that is parsed, the IMEI may be obtained from the call detail record. The method may then uniquely identify the mobile user endpoint device associated with the call detail record based on the type, make, and model of the mobile user endpoint device included in the IMEI. The method may also determine the version of software on which the mobile user endpoint device is running. The method may then aggregate the plurality of mobile user endpoint devices into at least one group based on information contained within the IMEIs of the respective call detail records. In other words, each mobile user endpoint device for which a call detail record is received may be mapped to at least one group based on information retrieved from the IMEI obtained from the call detail record of the mobile user endpoint device.

Figure 2:
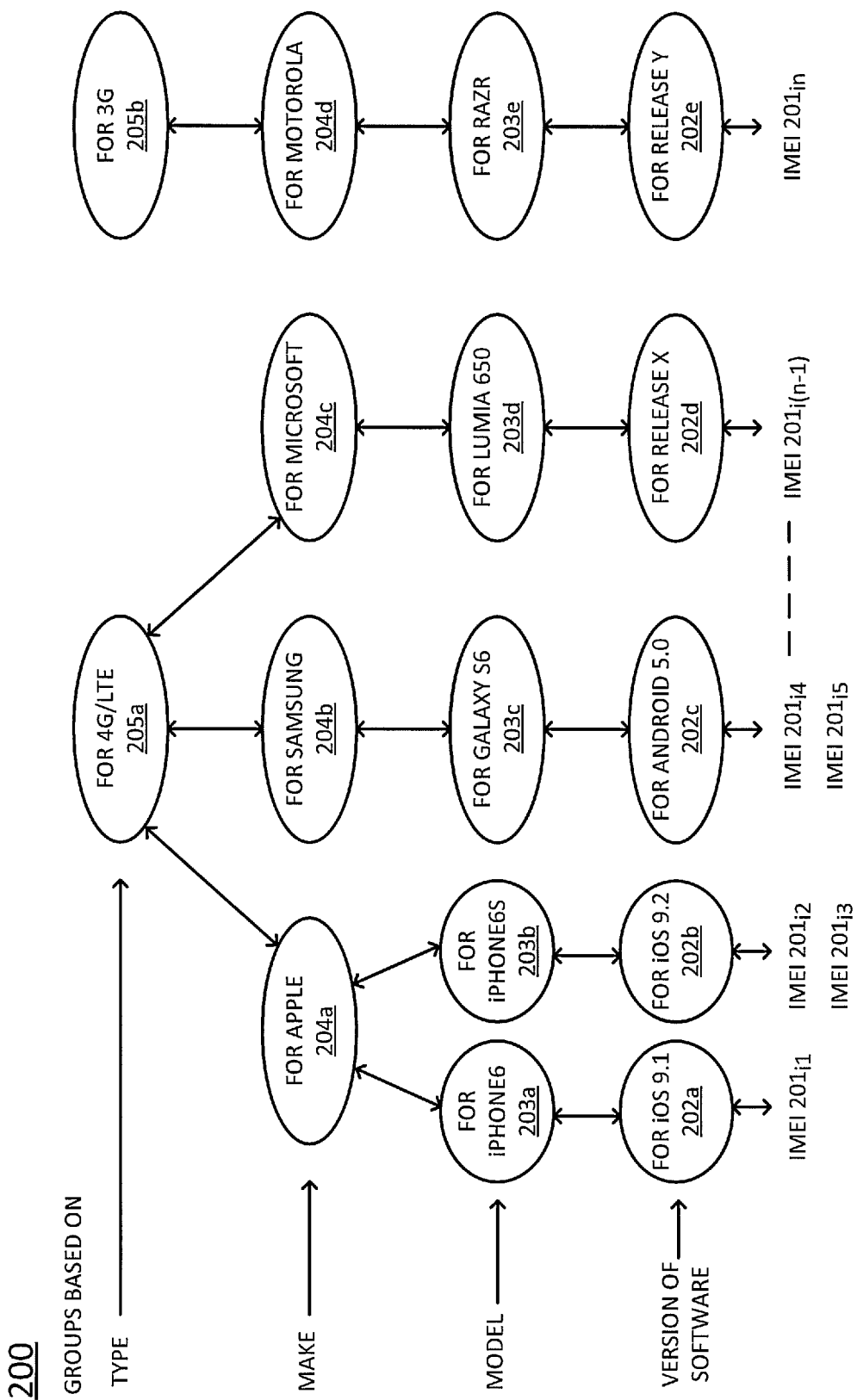
FIG. 2 illustrates an example hierarchy related to the present disclosure for assessing a service performance.

FIG. 2 illustrates an example hierarchy 200 related to the present disclosure for assessing a service performance. The hierarchy 200 is for aggregating IMEIs $201_{i1}$, $201_{i2}$, $201_{i3}$, . . . , $201_{in}$ into at least one of: a group for a type, a group for a make, a group for a model, and a group for a version of software. The example hierarchy 200 comprises four types of groups for mapping the user endpoint devices to at least a group established for assessing the service performance. Groups 205a-205b are established for assessing the service performance based on a type, groups 204a-204d are established for assessing the service performance based on a make, groups 203a-203e are established for assessing the service performance based on a model, and groups 202a-202e are established for assessing the service performance based on a version of software. For example, group 205a is a group established for mobile user endpoint devices connecting to 4G (LTE) networks; group 205b is a group established for mobile user endpoint devices connecting to 3G networks; group 204a is a group established for mobile user endpoint devices manufactured by Apple; group 204b is a group established for mobile user endpoint devices manufactured by Samsung; group 204c is a group established for mobile user endpoint devices manufactured by Microsoft; group 204d is a group established for mobile user endpoint devices manufactured by Motorola; group 203a is a group established for mobile user endpoint devices that are iPhone6 models; group 203b is a group established for mobile user endpoint devices that are iPhone6S models; group 203c is a group established for mobile user endpoint devices that are Galaxy S6 Edges; group 203d is a group established for mobile user endpoint devices that are Lumia (e.g., Lumia 650); group 203e is a group established for mobile user endpoint devices that are Motorola RAZR; group 202a is a group established for mobile user endpoint devices that are running iOS 9.1; group 202b is a group established for mobile user endpoint devices that are running iOS 9.2; group 202c is a group established for mobile user endpoint devices that are running Android 5.0 (i.e., Lollipop); group 202*d* is a group established for mobile user endpoint devices running a Microsoft software version x; and group 202*e* is a group established for mobile user endpoint devices running a Motorola software version y. It should be noted that these illustrative groupings are only examples and are intended to illustrate how various groupings can be organized and created, but these examples should not be interpreted to be limitations on the scope of the present disclosure.

As shown in FIG. 2, the IMEI $201_{i1}$ is mapped to groups 205*a*, 204*a*, 203*a* and 202*a*. Similarly, IMEIs $201_{i2}$ and IMEIs $201_{i3}$ are mapped to groups 205*a*, 204*a*, 203*b* and 202*b*. IMEIs $201_{i4}$ and IMEIs $201_{i5}$ are mapped to groups 205*a*, 204*b*, 203*c* and 202*c*. IMEI $201_{i(n-1)}$ is mapped to groups 205*a*, 204*c*, 203*d* and 202*d*. IMEI $201_{in}$ is mapped to groups 205*b*, 204*d*, 203*e* and 202*e*.

As described above, the method of the present disclosure is for determining an impact of a software upgrade on a service performance. The impact of the software upgrade on the service performance is to be assessed at a group level. In other words, the impact on the service performance is for a group of mobile user endpoint devices and not for individual mobile user endpoint devices. For example, the network service provider may wish to assess the impact of the software upgrade for mobile user endpoint devices that are aggregated into the same group that is established based on a type, a make, or a model of the mobile user endpoint device. Then, the method of the present disclosure determines the impact of the software upgrade on the service performance for the group.

The determination of the impact of the software upgrade on the service performance is made upon detecting a statistically significant change in service performance close to a time of a software upgrade. Suppose, a new Operating System (OS) software is released during a given time period, e.g., a given 24 hour period. Suppose, the new OS software is incompatible with 2G networks. Suppose also a change in a service performance is detected for mobile user endpoint devices that access services via a 2G network. For example, mobile user endpoint devices that downloaded the new OS software and proceeded to access services via a 2G network may begin experiencing a change in a service performance. Whether the change in the service performance is due to the software upgrade is based at least in part on a length of time between when the software upgrade to the new OS software occurred and when the change in the service performance is detected.

In one typical scenario, the user of the mobile user endpoint device will determine when a software upgrade is to be performed on his/her mobile user endpoint device. For example, a manufacturer may issue a push notification to mobile user endpoint devices produced by the manufacturer. A user may accept the push notification and proceed to download the new release of software immediately. Another user may reject the push notification or delay acting on the push notification until a convenient time is found for downloading the new release of software. In another example, a new software release may be downloaded when a user issues a command to perform the downloading of the new software release onto his/her mobile user endpoint device. As the examples show, for a large number of mobile user endpoint devices, the software upgrade to a new release may be staggered over a long period of time, e.g., several days, weeks, and the like. As such, detecting the software upgrade for a group of mobile user endpoint devices is a non-trivial matter.

In one embodiment, the method of the present disclosure utilizes a threshold based approach for detecting the software upgrade. As described above, when a call detail record is parsed, the method may obtain the IMEI which contains information for representing the version of software installed in the mobile user endpoint device. In addition, each call detail record that is parsed includes a time of call or session. Then, the method may determine the version of software installed in the mobile user endpoint device at a time associated with the call detail record. Once the call detail records associated with a mobile user endpoint device are parsed, the call detail records associated with the mobile user endpoint device may be sorted chronologically. When a change is detected in the version of software between two consecutive call detail records associated with the mobile user endpoint device, the method defines the time associated with the later call detail record as the time at which a change in the version of software occurred.

It is noted that a user may not initiate a session immediately after performing a software upgrade to a new version of software on his/her mobile user endpoint device. Thus, a call detail record that includes the new version of software may be received only after at least one session is initiated after the software upgrade. When the user initiates a session after some time has elapsed after the software upgrade, the method of the present disclosure uses the time associated with the earliest call detail record that includes the new version of software as the time at which the change in the version of software for the mobile user endpoint device has occurred.

For example, suppose a user of a mobile user endpoint device initiates a voice session at time t1, a data session at time t2, and a data session at time t3. Suppose time t2 is an hour after time t1 and time t3 is five minutes after time t2. In turn, the method may obtain a call detail record for the voice session from a switch. Similarly, the method may obtain call detail records for the data sessions from one or more routers. The IMEIs in the associated call detail records for the times t1, t2 and t3 may be determined by parsing the respective call detail records. Suppose the IMEI of the call detail record for time t1 indicates that the mobile user endpoint device is running on software version one and the IMEIs of the call detail records for times t2 and t3 indicate that the mobile user endpoint device is now running on software version two. Then, the method uses t2 as the time at which the change from software version one to software version two has occurred. Returning to the example of FIG. 2, suppose an IMEI is running iOS 9.1 at time t1 and running iOS 9.2 at time t2. Then, the IMEI is mapped to group 202*a* at time t1 and to group 202*b* at times t2 and t3 and so on.

As described above, the determining of the impact of the software upgrade on a service performance is to be performed for a group of mobile user endpoint devices and not for individual mobile user endpoint devices. Similarly, the detecting of the software upgrade is also to be performed for a group of mobile user endpoint devices and not for individual mobile user endpoint devices. The method establishes aggregates for detecting the software upgrade, as described below.

In one example, the method first establishes at least one aggregate of a first type and at least one aggregate of a second type. Each aggregate of the first type comprises an aggregate for mapping mobile user endpoint devices that are in the same group established based on a type, in the same group established based on a make, and in the same group established based on a model. Each aggregate of the second type comprises an aggregate for mapping mobile user endpoint devices that are in the same group established based on a type, in the same group established based on a make, in the same group established based on a model, and the same group established based on a version of software.

Figure 3:
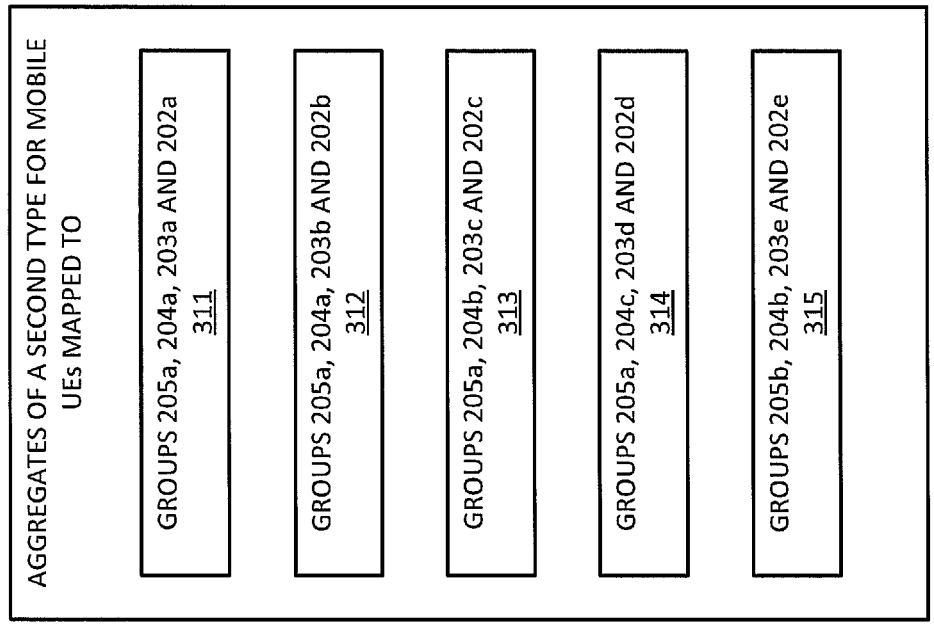
FIG. 3 illustrates an example mapping related to the present disclosure for mapping mobile user endpoint devices to at least one aggregate.
Figure 3:
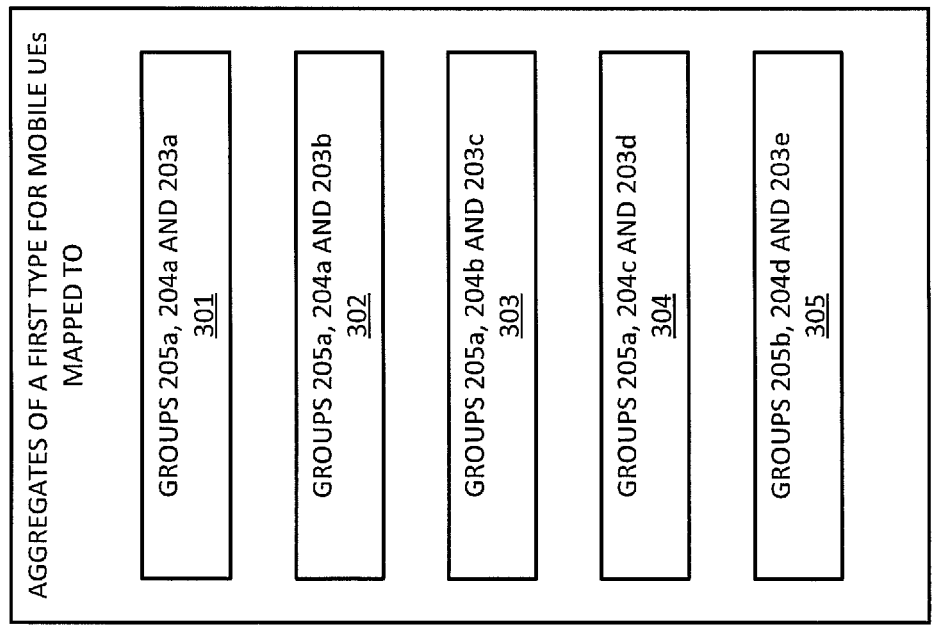

FIG. 3 illustrates an example mapping 300 related to the present disclosure for mapping mobile user endpoint devices to at least one aggregate. The method establishes aggregates 301-305 as aggregates of the first type. The aggregate 301 is established for mobile user endpoint devices that are mapped to groups 205a, 204a and 203a. Similarly, the aggregate 302 is established for mobile user endpoint devices that are mapped to groups 205a, 204a and 203b, aggregate 303 is established for mobile user endpoint devices that are mapped to groups 205a, 204b and 203c, aggregate 304 is established for mobile user endpoint devices that are mapped to groups 205a, 204c and 203d, and aggregate 305 is established for mobile user endpoint devices that are mapped to groups 205b, 204d, and 203e.

The method also establishes aggregates 311-315 as aggregates of the second type. The aggregate 311 is established for mobile user endpoint devices that are mapped to groups 205a, 204a, 203a and 202a. Similarly, aggregate 312 is established for mobile user endpoint devices that are mapped to groups 205a, 204a, 203b and 202b, aggregate 313 is established for mobile user endpoint devices that are mapped to groups 205a, 204b, 203c and 202c, aggregate 314 is established for mobile user endpoint devices that are mapped to groups 205a, 204c, 203d and 202d, and aggregate 315 is established for mobile user endpoint devices that are mapped to groups 205b, 204d, 203e and 202e.

Once the aggregates of the first type and the aggregates of the second type are established, the method maps each mobile user endpoint device to a first aggregate and a second aggregate. The first aggregate is an aggregate of the first type and the second aggregate is an aggregate of the second type. The example mapping 300 may be used for the example of FIG. 2. For instance, IMEI $201_{i1}$ may be mapped to aggregates 301 and 311, IMEIs $201_{i2}$ and $201_{i3}$ may be mapped to aggregates 302 and 312, IMEIs $201_{i4}$ and $201_{i5}$ may be mapped to aggregates 303 and 313, IMEI $201_{i(n-1)}$ may be mapped to aggregates 304 and 314, and IMEI $201_{in}$ may be mapped to aggregates 305 and 315.

In one example, the method then computes a penetration rate for each combination of an aggregate of the first type and an aggregate of the second type. The penetration rate represents a percentage of mobile user endpoint devices of the same type, make and model that are running the version of software represented in the aggregate of the second type. In one embodiment, the penetration rate is computed in a predetermined time interval, e.g., every 5 minutes, every 15 minutes, every hour, etc. To illustrate by way of an example, suppose the penetration rate is to be computed for mobile user endpoint devices mapped to aggregate 301 (i.e., iPhone6 devices manufactured by Apple and attaching to a 4G network) that are being upgraded to iOS 9.1 from a previous version of software. In other words, for each time interval, the penetration rate may be computed and stored for each combination of type, make, model, and version of software. As more and more of the mobile user endpoint devices mapped to aggregate 301 are upgraded to iOS 9.1, the penetration rate for the combination of the aggregates 301 and 311 increases. Suppose, for a given time interval, there are one hundred mobile user endpoint devices mapped to aggregate 301 and five of which are also mapped to aggregate 311. Then, for the given time interval, the penetration rate for the combination of the aggregates 301 and 311 is 5%.

Then, for each time interval, the method stores the penetration rate that is computed as a value of a parameter of the aggregate of the second type. The method may then track the penetration rate over time.

Then, for each combination of an aggregate of a first type and an aggregate of a second type, the method detects the software upgrade when the penetration rate for the version of software reaches a predetermined threshold. The version of software is associated with the aggregate of the second type. In one embodiment, the network service provider will establish the predetermined threshold for determining whether the software upgrade is detected for a present time interval. The present time interval is defined as the time interval for which a determination is being made as to whether the software upgrade occurred. The predetermined threshold is selected such that a service performance prior to the software upgrade is captured during a time interval prior to the software upgrade. For example, suppose the time interval for computing the penetration rates is an hourly time interval and the present time interval is a time interval between 10:00 A.M. and 11:00 A.M. on a given day. Then, the time interval prior to the software upgrade refers to the time interval between 9:00 A.M. and 10:00 A.M. on the same day. For example, suppose the predetermined threshold for detecting the software upgrade to iOS 9.1 is set to 10%. Then, for the present time interval, the method detects the software upgrade when the penetration rate reaches the 10%. The method then records (i.e., stores) the software upgrade that is detected.

The software upgrade that is detected may have an impact on a service performance. In one example, the software upgrade may have a positive impact on the service performance. For instance, a service performance of a voice or data service may improve. In another example, the software upgrade may have a negative impact on the service performance. In yet another example, the software upgrade may have no impact on the service performance. In yet another example, the software upgrade may have an impact that is considered statistically insignificant. Thus, the mere detection of the software upgrade is not enough for determining that the software upgrade has an impact on the service performance.

In one embodiment, the method of the present disclosure determines whether the software upgrade has an impact on a service performance is based on: detecting the software upgrade, determining whether a change in service performance is detected, and determining whether the change in service performance coincides with the software upgrade that is detected when the change in the service performance is detected. More specifically, in one embodiment, for each aggregate of the first type, the method determines whether the change in the service performance is detected by comparing service performances across different time intervals. As noted above, for each time interval, the call detail records include session statistics for various sessions during the time interval. The service performance for each time interval may be determined based on session statistics obtained by parsing the call detail records for call sessions of the time interval. The method may then track the service performance over time for each aggregate of the first type. For an aggregate of the first type, the tracking of the service performance over time enables the network service provider to establish a measure of the service performance for the aggregate of the first type. For example, the measure of the service performance may comprise at least one of: a mean, a median and a standard deviation of the service performance of the aggregate of the first type.

In one embodiment, for the aggregate of the first type, the network service provider establishes a condition for determining whether the change in service performance is detected. The condition for determining whether the change in service performance is detected may be based on a threshold that is established for the service performance for the aggregate of the first type. For example, the change in the service performance may be detected when a change in the service performance is greater than a predetermined threshold established for representing a change in service performance. For instance, the predetermined threshold for a change in a percentage of calls being dropped may be 5%.

In one embodiment, the predetermined threshold for the change in service performance may be for all aggregates of the first type. For example, the network service provider may select one value for the predetermined threshold that satisfies the service needs of all aggregates of the first type. In one embodiment, the predetermined threshold for the change in a service performance may be set on an aggregate of the first type basis. In other words, a value of the predetermined threshold for the change in the service performance for an aggregate of the first type may be set independently of a predetermined threshold for another aggregate of the first type.

When the change in service performance is detected for an aggregate of the first type, the method records a time of change of a service performance (i.e., a current time of change in service performance), a previous time relative to the time when the change in the service performance is detected (i.e., a time period immediately prior to the current time of change), a subsequent time relative to the time when the change in the service performance is detected (i.e., a time period immediately after the current time of change), and a statistical measure of the change in the service performance that is detected. For example, suppose for an aggregate of the first type, the change in the service performance is detected at time t. Then, the statistical measure of the change in service performance may be determined by comparing the service performance between times t−1 and t against the service performance between times t and t+1. For example, suppose the call detail records are obtained and analyzed for each hourly interval. Suppose the current time interval for which the change is detected is a time interval between 10:00 A.M. and 11:00 A.M. on a given day. Then, the statistical measure of the change in service performance is determined by comparing the service performance of the current time interval against the service performance between 9:00 A.M. and 10:00 A.M. on any given day. In one embodiment, the statistical measure of the change in service performance comprises at least one of: a mean of the change in service performance, a median of the change in service performance, and a standard deviation of the change in service performance.

As noted above, when the change in service performance is detected for an aggregate of the first type, the method records a time of change of service performance, a previous time of change of service performance, and a subsequent time of change of service performance. Hence, for each aggregate of the first type, the change in service performance is tracked in a recursive manner. For example, suppose time intervals 1, 2, 3, . . . , 100 are consecutive time intervals and a software upgrade is detected for time intervals 2, 15 and 60. Then, for time interval 15, the prior time of change of service performance and the subsequent time of change of service performance are recorded as being time intervals 2 and 60, respectively. Similarly, for time interval 60, the prior time of change of service performance is recorded as being time interval 15. The subsequent time of change of service performance for time interval 60 is recorded when the next change of service performance is detected and recorded.

For each change in service performance that is detected for the aggregate of the first type, the method determines whether at least one software upgrade is detected as being a software upgrade that has occurred within a predetermined time window T of the time of change in the service performance. When no software upgrade is detected within the predetermined time window T of the time of change in service performance, the method provides a notification indicating that the change in the service performance is detected and no inference is made in regards to a cause related to a software upgrade. Otherwise, the method identifies a nearest co-occurring software upgrade. The nearest co-occurring software upgrade is identified from among the software upgrades that are detected as being software upgrades that have occurred within the predetermined time window T surrounding or bounding the time of change in service performance. Moreover, the nearest co-occurring software upgrade comprises the software upgrade that occurred closest to the time of change in service performance. For example, suppose the predetermined time window T is 7 days and the change in service performance is detected for the aggregate of the first type on Jun. 17, 2015 at 11:00 A.M. Then, the nearest co-occurring software upgrade is selected from among software upgrades that occurred between 11:00 A.M. on Jun. 10, 2015 and Jun. 24, 2015 at 11:00 A.M. Suppose the software upgrades that occurred within the predetermined time window T are one upgrade on Jun. 16, 2015 and one upgrade on Jun. 11, 2015. Then, the method selects the software upgrade that occurred on Jun. 16, 2015 as the nearest co-occurring software upgrade.

In one embodiment, the predetermined time window T for an aggregate of the first type is selected based on a number of mobile user endpoint devices that are mapped to the aggregate of the first type. For example, the aggregate of the first type may be for a popular model and a change in service performance may be detected in a relatively short time. For instance, there are millions of users of iPhone 6S model mobile user endpoint devices. Thus, the number of call detail records collected for such devices may be in the range of several thousands per hour or more. Hence, a change in service performance may be detected within a few hours, e.g., five hours. In contrast, for an aggregate of the first type with limited number of users, the change in service performance may not be detected until call detail records are obtained for a longer time interval, e.g., a week. The network service provider may then set the value of T for the aggregate of the first type based on a number of mobile user endpoint devices that are mapped to the aggregate of the first type.

For each change in the service performance that is detected for the aggregate of the first type for which a nearest co-occurring software upgrade is identified, the method determines or infers that the nearest co-occurring software upgrade is a cause for the change in the service performance that is detected when the nearest co-occurring software upgrade is not a false co-occurring software upgrade. That is, the determining comprises determining whether the nearest co-occurring software upgrade is a false co-occurring software upgrade, and only determining that the software upgrade is the cause for the change in the service performance when the nearest co-occurring software upgrade is not a false co-occurring software upgrade. The method for determining whether the nearest co-occurring software upgrade is a false co-occurring software upgrade is further described below.

In one embodiment, for each change in the service performance that is detected for the aggregate of the first type for which a nearest co-occurring software upgrade is identified, the method also determines whether the change in service performance that is detected is for: an improvement or a degradation in the service performance. That is, when the change in the service performance is detected, the method identifies the nearest co-occurring software upgrade and further determines whether the change in service performance due to the software upgrade is causing an improvement in the service performance or is causing a degradation in the service performance.

The method then provides a notification indicating that the change in the service performance is detected. In one embodiment, the notification further includes an identification of the nearest co-occurring software upgrade. For example, the method may identify an upgrade from a version of software x to a version of software y as the cause for the change in the service performance.

In one embodiment, the notification comprises a recommendation to be provided to a manufacturer of a mobile user endpoint device. For example, the recommendation may be for requesting that the manufacturer provide a fix to the version of software associated with the aggregate of the second type.

In one embodiment, the notification comprises a recommendation to be provided directly to customers of the network service provider. For example, the network service provider may determine that customers who access services via a model of a mobile user endpoint device and have recently upgraded from a first version of a software to a second version of the software may experience a degraded service due to the recent software upgrade. In turn, the recommendation may indicate to the customers to avoid upgrading from the first version of the software to the second version of the software. In one embodiment, the notification may be provided as a service to which a customer of the network service provider subscribes.

In one embodiment, the notification may comprise a recommendation to modify an access to a service. For example, when a software upgrade from a first version to a second version of a software causes a throughput problem throughout a network, the network service provider may deny one or more services to customers accessing via a mobile user endpoint device in which the second version of the software is installed.

In one embodiment, the notification may comprise an announcement to customers of the network service provider. The announcement may indicate that a particular version of a software is providing an improvement or a degradation in accessing at least one service. In one embodiment, the announcement may be provided via a social network. For example, the announcement may be published on a social network site of the network service provider.

Returning to the determination of whether the nearest co-occurring software upgrade is a false co-occurring software upgrade, the method defines a "true" co-occurring software upgrade as a software upgrade for which the impact on service performance is attributable to the software upgrade. In other words, the impact on the service performance is attributable to the software upgrade alone. In contrast, when the impact on the service performance is not directly attributable to the software upgrade alone, the software upgrade is said to be a "false" co-occurring software upgrade. Thus, the use of the terms "true" and "false" are not intended to mean whether the detected software upgrade is truly a software upgrade or not, but instead whether the detected software upgrade is truly the main cause for the effect on a particular service performance.

In some scenarios, the impact of the service performance is an improvement for some network locations and a degradation for other network locations. When the impact of the service performance is an improvement for some network locations and a degradation for other network locations, the impact of the service performance may or may not be attributable to the software upgrade.

In order to determine whether the impact is attributable to the software upgrade, the method of the present disclosure compares the difference between a number of network locations with an improvement in the service performance and a number of locations with a degradation in the service performance against a predetermined threshold. When the difference is less than or equal to the predetermined threshold, the method of the present disclosure concludes that the impact of the service performance is due to a general interaction between a software in the mobile user endpoint device and a software in the network of the network service provider. When the impact of the service performance is due to the interaction, the software upgrade is said to be a false co-occurring software upgrade. When the impact of the service performance is not due to the interaction, the impact of the service performance is attributable to the software upgrade and the software upgrade is deemed to be a true co-occurring software upgrade.

In one embodiment, in order to identify the software upgrades that are false co-occurring software upgrades, the method first modifies the aggregates of the first type and the aggregates of the second type by including network location information for each mobile user endpoint device. The network location may be obtained by parsing the call detail records that are obtained.

Then, for each network location, the method determines whether the same change in a service performance is detected for an aggregate of the second type and for a complementary aggregate of the second type. The complementary aggregate of the second type is an aggregate for mapping mobile user endpoint devices that are mapped to the aggregate of the first type and are not mapped to the aggregate of the second type. For example, for a particular network location, suppose there are one hundred mobile user endpoint devices mapped to an aggregate of the first type. Suppose ten of the mobile user endpoint devices that are mapped to the aggregate of the first type are also mapped to the aggregate of the second type. For example, ten of the mobile user endpoint devices at the particular network location are upgraded to the version of software associated with the aggregate of the second type. Then, the remaining 90 mobile user endpoint devices at the particular network location are mapped to the complementary aggregate of the second type. For example, the remaining 90 mobile user endpoint devices at the particular network location have not been upgraded to the version of software associated with the aggregate of the second type.

When the same change in the service performance is detected for the aggregate of the second type and the complementary aggregate of the second type for the network location, the method removes data obtained from call detail records from consideration associated with the network location. For instance, the same change in the service performance may be observed for the upgraded and the non-upgraded mobile user endpoint devices at the network location. The method then labels the change in the service performance for the network location as a network centric change. When the change in the service performance that is detected is a network centric change, the software upgrade is deemed to be a false co-occurring software upgrade for the network location. Then, all session statistics and IMEI retrieved from call detail records for the network location are removed from consideration.

Then, for each network location for which the change in the service performance is not the same for the aggregate of the second type and the complementary aggregate of the second type, the method determines an impact of the software upgrade for the network location. The impact of the software upgrade for the network location may comprise an improvement in the service performance or a degradation in the service performance.

Once the impact of the software upgrade is determined for each network location for which the change is not labeled as a network centric change, the method determines a difference between a number of network locations for which the impact of the software upgrade is an improvement in the service performance and a number of network locations for which the impact of the software upgrade is a degradation in the service performance. For instance, the number of network locations for which the impact of the software upgrade is an improvement in the service performance may be provided as a value of a parameter $n_{improve}$ and the number of network locations for which the impact of the software upgrade is a degradation in the service performance may be provided as a value of a parameter $n_{degrade}$. Then, a value of a parameter $n_{diff}$ may be set as an absolute value of a difference between the values of $n_{improve}$ and $n_{degrade}$. That is, $n_{diff}=|n_{improve}-n_{degrade}|$.

Then, the method compares the difference between the number of network locations for which the impact of the software upgrade is an improvement and the number of network locations for which the impact of the software upgrade is a degradation against a predetermined threshold k for the difference. For example, the method determines whether the value of $n_{diff}$ is less than or equal to the predetermined threshold k. When the difference is less than the predetermined threshold, the method determines that the impact to the service performance is due to an interaction between the mobile device and the network of the service provider. In other words, the software upgrade is a false co-occurring software upgrade and is not responsible for the observed impact to the service performance.

In one embodiment, the predetermined threshold k may be established by the network service provider such that the service performance impact attributable to the software upgrade is assessed based on a service performance impact that is observed by a majority of network locations. When $n_{diff} \leq k$, the service performance impact may be due to an interaction between the mobile devices and the network of the service provider and may not be attributable to the software upgrade itself. In another example, suppose k=5, and 125 network locations have an improvement in the service performance and 95 network locations have a degradation in the service performance. Then, $n_{diff}$ is clearly greater than the value of k. Then, the impact that is observed may be due to the software upgrade itself.

In another example, suppose k=20, and 102 network locations have an improvement in the service performance and 100 network locations have a degradation in the service performance. Then, $n_{diff}$ is clearly less than the value of k. Thus, the service performance impact that is observed may be due to an interaction between the mobile devices and the network of the service provider that is not attributable to the software upgrade. Thus, the determining of the service performance impact of the software upgrade may include isolating the service performance impact that is labeled "mobile user endpoint device-centric" from the service performance impact that is labeled "network-centric," i.e., due to an interaction between the mobile user endpoint device and the network of the service provider.

In one embodiment, an application server 112 is used for implementing the present method for determining the impact of a software upgrade on a service performance. The AS 112 of the present disclosure is for obtaining call detail records associated with a plurality of mobile user endpoint devices, aggregating each mobile user endpoint device of the plurality of mobile user endpoint devices into at least one group, wherein each group of the at least one group is established based on at least one of: a type of each mobile user endpoint device, a make of each mobile user endpoint device, a model of each mobile user endpoint device, and a version of a software deployed on each mobile user endpoint device, wherein the type, the make, the model, and the version of the software are obtained from a respective call detail record associated with each mobile user endpoint device, mapping each mobile user endpoint device of the plurality of mobile user endpoint devices to at least one first aggregate, wherein each aggregate of the at least one first aggregate comprises at least one of: a group established based on a type of the mobile user endpoint devices, a group established based on a make of the mobile user endpoint devices, and a group established based on a model of the mobile user endpoint devices, identifying a nearest co-occurring software upgrade when a change in a service performance in the communications network is detected, and determining that the nearest co-occurring software upgrade is a cause for the change in the service performance that is detected.

Figure 4:
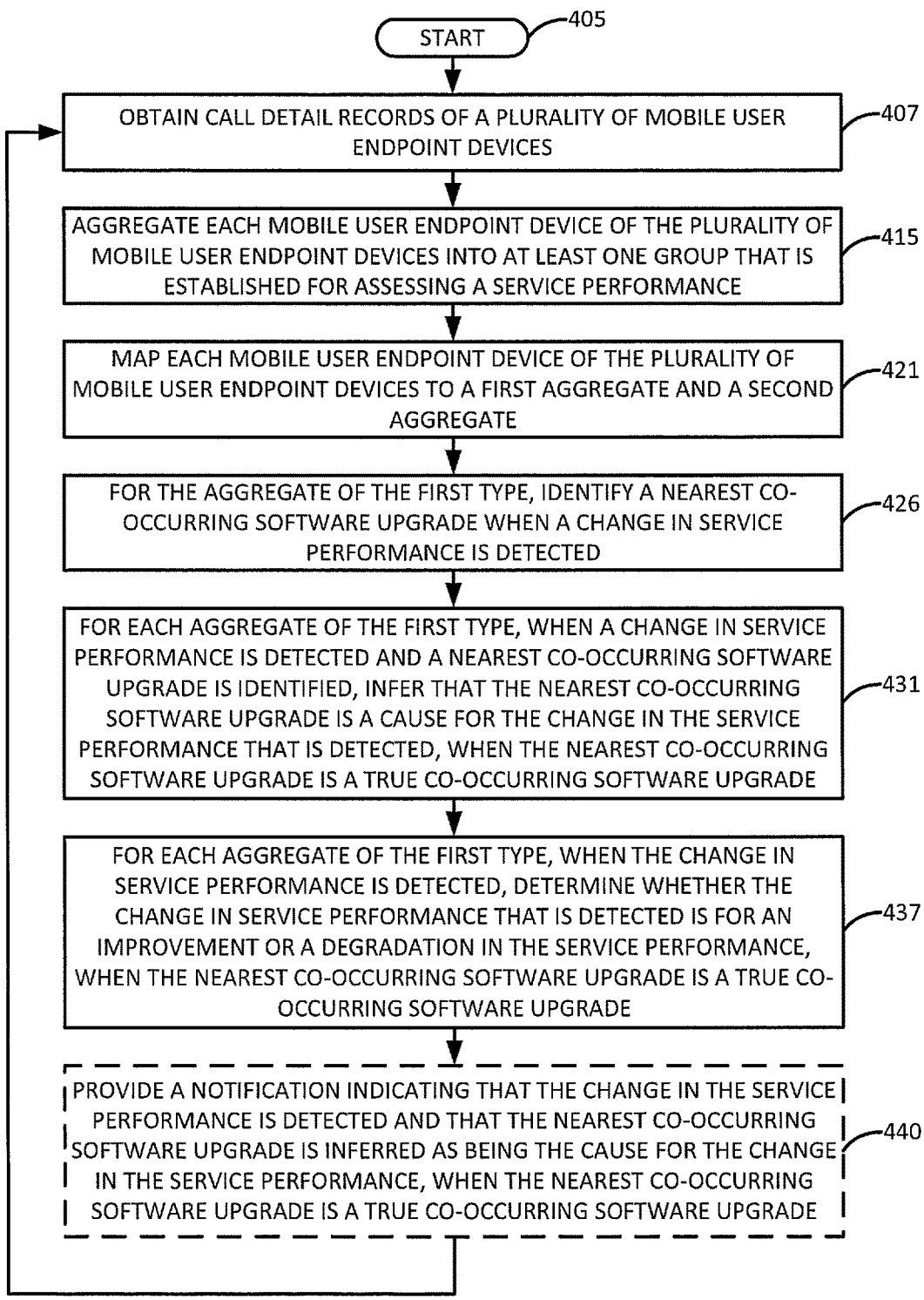
FIG. 4 illustrates a flowchart of an example method for determining the impact of a software upgrade of a mobile user endpoint device on a service performance in accordance with the present disclosure.

FIG. 4 illustrates a flowchart of an example method 400 for determining the impact of a software upgrade for a mobile user endpoint device on a service performance in accordance with the present disclosure. In one embodiment, the method 400 may be implemented in an application server, e.g., an AS 112, or the processor 702 as described in FIG. 7. The method 400 starts in step 405 and proceeds to step 407.

In step 407, the processor obtains call detail records of a plurality of mobile user endpoint devices. For example, the call detail records may be obtained from various network devices, e.g., routers, switches, etc.

In step 415, the processor aggregates each mobile user endpoint device of the plurality of mobile user endpoint devices into at least one group that is established for assessing a service performance. Each group of these groups established for assessing a service performance is established based on a type, a make, a model, or a version of a software of a mobile endpoint device. The type, the make, the model, and the version of software are obtained from a call detail record associated with the mobile user endpoint device.

In step 421, the processor maps each mobile user endpoint device of the plurality of mobile user endpoint devices to a first aggregate and a second aggregate. The first aggregate is an aggregate of at least one aggregate of a first type and the second aggregate is an aggregate of at least one aggregate of a second type. Each aggregate of the first type comprises an aggregate for mapping mobile user endpoint devices that are in the same group established based on a type, in the same group established based on a make, and in the same group established based on a model. Each aggregate of the second type comprises an aggregate for mapping mobile user endpoint devices that are in the same group established based on a type, in the same group established based on a make, in the same group established based on a model, and the same group established based on a version of software.

It is important to note that mobile user point devices that are not popular may be too few to separate based on one or more of the above hierarchies. For example, for a new manufacturer, distinguishing between models may not be useful. Thus, mobile user endpoint devices may be mapped to the first and second aggregates by accepting a value of null (i.e., not included) as a valid type, a valid make, a valid model, and so on.

In step 426, for the aggregate of the first type, the processor identifies a nearest co-occurring software upgrade when a change in service performance is detected. For example, the nearest co-occurring software upgrade can be selected from among software upgrades that have occurred within a predetermined time window that is proximate to a time period when the change of service performance is detected.

Figure 6:
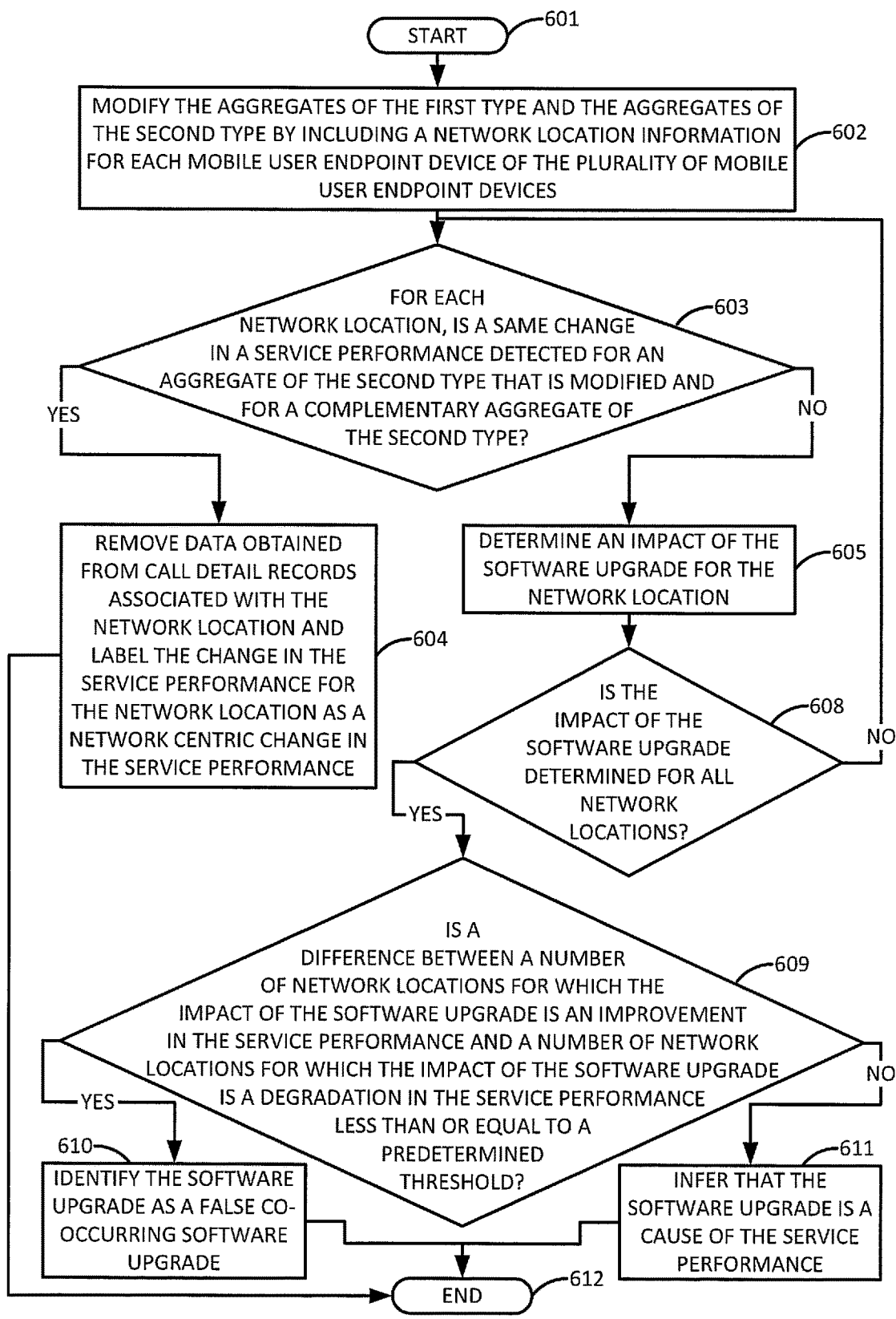
FIG. 6 illustrates an example method for determining whether the nearest co-occurring software upgrade is a false co-occurring software upgrade.

In step 431, for each aggregate of the first type, when a change in service performance is detected and a nearest co-occurring software upgrade is identified, the processor infers that the nearest co-occurring software upgrade is a cause for the change in the service performance that is detected. In one embodiment, the nearest co-occurring software upgrade is deemed to be a true co-occurring software upgrade. FIG. 6 described below, illustrates an example method 600 for determining whether the nearest co-occurring software upgrade is a true co-occurring software upgrade or a false co-occurring software upgrade.

In step 437, for each aggregate of the first type, when the change in service performance is detected, the processor determines whether the change in service performance that is detected is for an improvement or a degradation in the service performance. For example, when the nearest co-occurring software upgrade is a true co-occurring software upgrade, the method determines whether the change in the service performance is an improvement or a degradation.

In optional step 440, the processor provides a notification indicating that the change in the service performance is detected and that the nearest co-occurring software upgrade is inferred as being the cause for the change in the service performance, when the nearest co-occurring software upgrade is a true co-occurring software upgrade. The processor then proceeds to step 407.

Figure 5A:
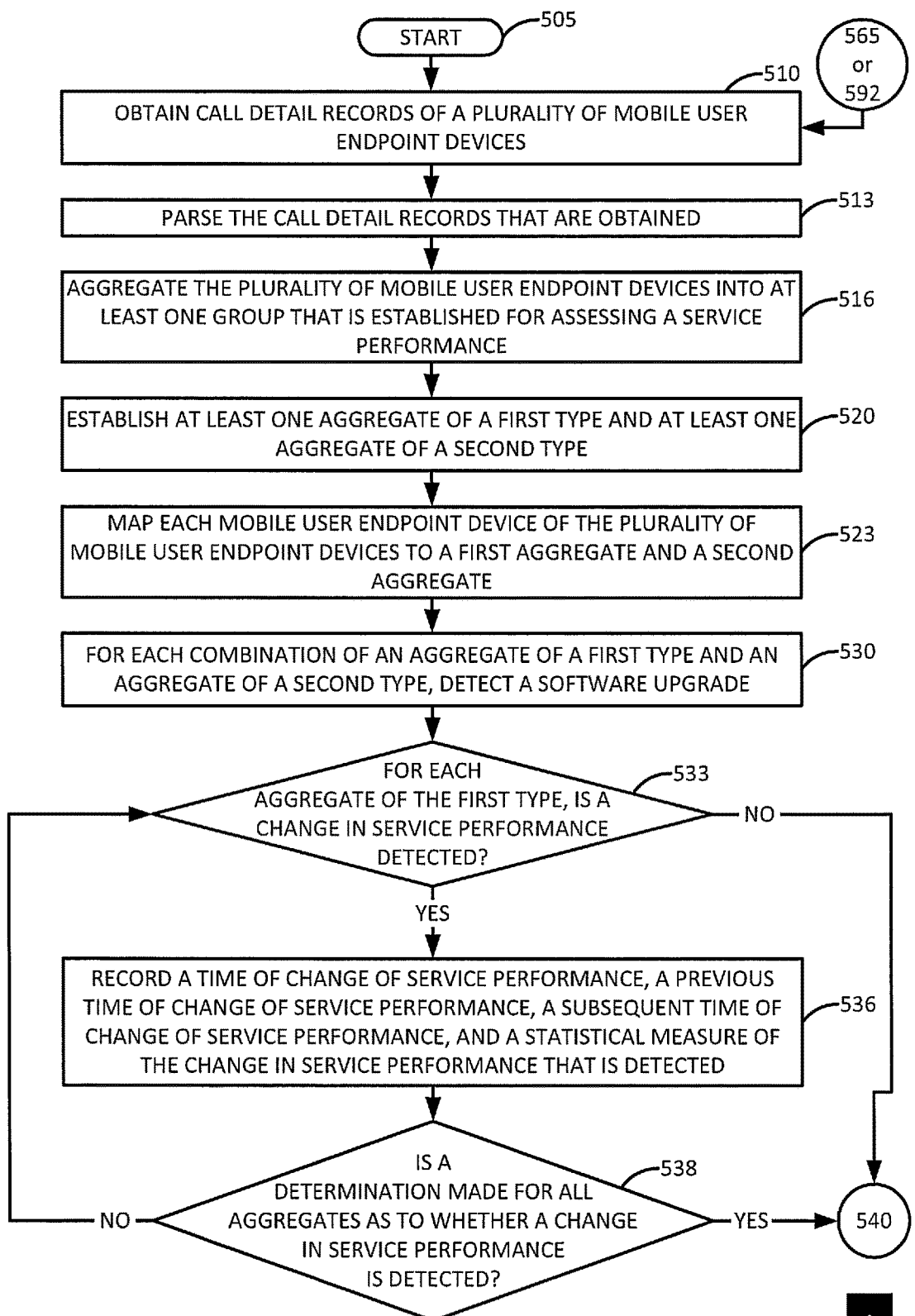
FIG. 5 (shown as FIG. 5A and FIG. 5B) illustrates a detailed flowchart of an example method for determining the impact of a software upgrade of a mobile user endpoint device on a service performance in accordance with the present disclosure.
Figure 5B:
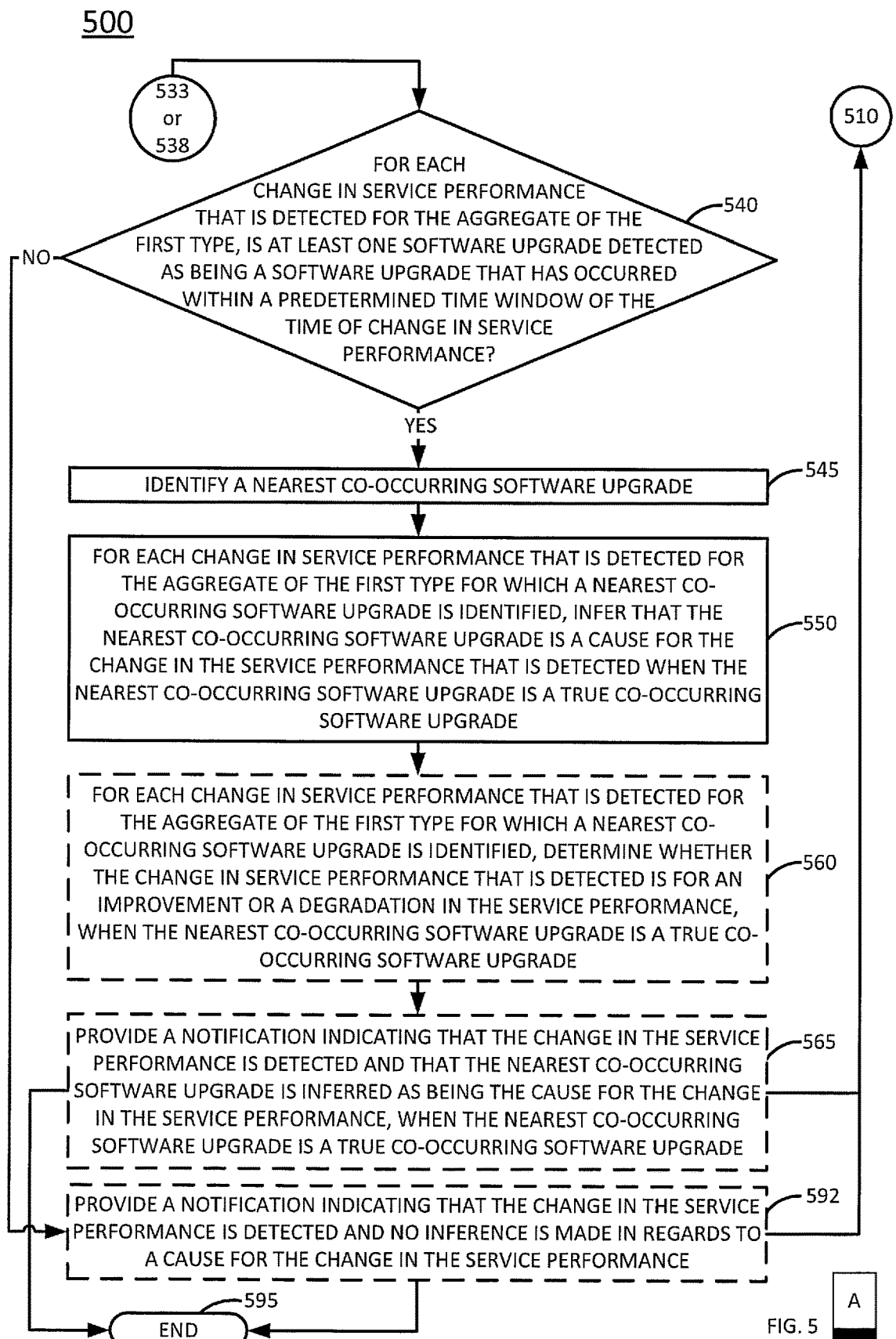

FIG. 5 (shown as FIG. 5A and FIG. 5B) illustrates a detailed flowchart of an example method 500 for determining the impact of a software upgrade to a user endpoint device on a service performance in accordance with the present disclosure. FIG. 5 includes the steps of the flowchart 400 described in FIG. 4. However, FIG. 5 illustrates additional steps that are used for establishing groups and aggregates, parsing call detail records, and the like. In one embodiment, the method 500 may be implemented in an application server, e.g., an AS 112, or the processor 702 as described in FIG. 7. The method 500 starts in step 505 and proceeds to step 510.

In step 510, the processor obtains call detail records of a plurality of mobile user endpoint devices. For example, the processor my obtain call detail records for call and data sessions from network switches and routers.

In step 513, the processor parses the call detail records that are obtained. The parsing is performed to obtain the type of network to which a mobile user endpoint device associated with the call detail record attaches, a make and a model of the mobile user endpoint device associated with the call detail record, a version of software installed in the mobile user endpoint device associated with the call detail record, and/or at least one call statistic.

In step 516, the processor aggregates the plurality of mobile user endpoint devices into at least one group that is established for assessing a service performance. For example, the group may be established for assessing the service performance based on a type, a make, a model, and/or a version of software employed in the mobile device.

In step 520, the processor establishes at least one aggregate of a first type and at least one aggregate of a second type. For example, each aggregate of the first type may comprise an aggregate for mapping mobile user endpoint devices that are in the same group established based on a type, in the same group established based on a make, and/or in the same group established based on a model. In another example, each aggregate of the second type may comprise an aggregate for mapping mobile user endpoint devices that are in the same group established based on the type, in the same group established based on a make, in the same group established based on a model, and/or the same group established based on a version of software.

In step 523, the processor maps each mobile user endpoint device of the plurality of mobile user endpoint devices to a first aggregate and a second aggregate. The first aggregate is an aggregate of the first type and the second aggregate is an aggregate of the second type.

In step 530, for each combination of an aggregate of a first type and an aggregate of a second type, the processor detects a software upgrade. The software upgrade is detected when a penetration rate for a version of software associated with the aggregate of the second type reaches a predetermined threshold.

In step 533, for each aggregate of the first type, the processor determines whether a change in service performance is detected. In one embodiment, the change in service performance may be detected when a change in the service performance is greater than a predetermined threshold for the change in service performance that is established for the aggregate of the first type. When the change in service performance is detected, the processor proceeds to step 536. Otherwise, the processor proceeds to step 540.

In step 536, the processor records a time of the detected change in the service performance (i.e., a current time when the change in service performance is detected), a previous time of the detected change of the service performance (i.e., immediately prior to the current time when the change in service performance is detected), a subsequent time of the detected change of the service performance (i.e., immediately after the current time when the change in service performance is detected), and a statistical measure of the change in the service performance that is detected. The processor then proceeds to step 538.

In step 538, the processor determines whether a determination as to whether a change in service performance is detected is made for all aggregates of the first type. When the determination is made for all aggregates of the first type, the processor proceeds to step 540. Otherwise, the processor proceeds to step 533.

In step 540, for each change in service performance that is detected for the aggregate of the first type, the method determines whether at least one software upgrade is detected as being a software upgrade that has occurred within a predetermined time window of the time when the change in service performance is detected. When no software upgrade is detected within the predetermined time window of the time when the change in service performance is detected, the processor proceeds to step 592. Otherwise, the processor proceeds to step 545.

In step 545, the processor identifies a nearest co-occurring software upgrade. The nearest co-occurring software upgrade comprises a software upgrade that occurred within the predetermined time window of the time when the change in service performance is detected. Moreover, the nearest co-occurring software upgrade comprises a software upgrade that occurred closest to the time when the change in service performance is detected. In other words, the nearest co-occurring software upgrade is identified from among the software upgrades that are detected as being software upgrades that have occurred within the predetermined time window of the time when the change in service performance is detected. Said another way, the nearest co-occurring software upgrade comprises the software upgrade that occurred closest (in time) to the time when the change in service performance is detected.

In step 550, for each change in service performance that is detected for the aggregate of the first type for which a nearest co-occurring software upgrade is identified, the processor may infer that the nearest co-occurring software upgrade is a cause for the change in the service performance that is detected when the nearest co-occurring software upgrade is a true co-occurring software upgrade. The true co-occurring software upgrade is a software upgrade that is not determined as being a false co-occurring software upgrade. FIG. 6 described below, illustrates an example method 600 for determining whether the nearest co-occurring software upgrade is a false co-occurring software upgrade.

In optional step 560, for each change in the service performance that is detected for the aggregate of the first type for which a nearest co-occurring software upgrade is identified, the processor determines whether the change in service performance that is detected is: an improvement or a degradation in the service performance, when the nearest co-occurring software upgrade is a true co-occurring software upgrade.

In step 565, the processor provides a notification indicating that the change in the service performance is detected and that the nearest co-occurring software upgrade is inferred as being the cause for the change in the service performance when the nearest co-occurring software upgrade is a true co-occurring software upgrade. In one embodiment, the notification further includes an identification of the nearest co-occurring software upgrade. In one embodiment, the notification further includes an indication as to whether the change in the service performance that is detected is an improvement in the service performance or a degradation in the service performance. The method then proceeds to step 595 to end the process or returns to step 510.

In step 592, the processor provides a notification indicating that the change in the service performance is detected and no inference is made in regards to a cause for the change in the service performance being attributable to a software upgrade. The method then proceeds to step 595 to end the process or returns to step 510.

In one embodiment, the AS 112 of the present disclosure is also for determining whether the nearest co-occurring software upgrade is a false co-occurring software upgrade. In other words, the AS 112 is for modifying at least one of: the aggregates of the first type and the aggregates of the second type by including a network location information for each mobile user endpoint device of the plurality of mobile user endpoint devices, for each network location, for determining whether the same change in a service performance is detected for an aggregate of the second type that is modified and for a complementary aggregate of the second type, for removing data obtained from call detail records associated with the network location from consideration and labeling the change in the service performance for the network location as a network-centric change in the service performance, when the same change in the service performance is detected for the aggregate of the second type that is modified and for the complementary aggregate of the second type, for determining an impact of the software upgrade for all network locations for which the change in the service performance is not labeled as being a network centric change, for determining whether a difference between a number of network locations for which the impact of the software upgrade is an improvement in the service performance and a number of network locations for which the impact of the software upgrade is a degradation in the service performance is less than or equal to a predetermined threshold, for identifying the software upgrade as a false co-occurring software upgrade when the difference is less than or equal to the predetermined threshold, and for identifying the software upgrade as a true co-occurring software upgrade when the difference is greater than the predetermined threshold.

FIG. 6 illustrates an example method 600 for determining whether a nearest co-occurring software upgrade is a false co-occurring software upgrade. For example, the method 600 may be used for determining whether a nearest co-occurring software upgrade is a true co-occurring software upgrade or a false co-occurring software upgrade as described in step 431 of method 400 or in step 550 of method 500. Method 600 starts in step 601 and proceeds to step 602.

In step 602, the processor modifies the aggregates of the first type and the aggregates of the second type by including a network location information for each mobile user endpoint device of the plurality of mobile user endpoint devices. For example, the aggregates of the first type and the aggregates of the second type of method 400 or 500 are modified to include network location information for each mobile user endpoint device.

In step 603, for each network location, the method determines whether the same change in a service performance is detected for an aggregate of the second type that is modified and for a complementary aggregate of the second type. The complementary aggregate of the second type is an aggregate for mapping mobile user endpoint devices that are mapped to the aggregate of the first type, but are not mapped to the aggregate of the second type that is modified. When the same change in the service performance is detected for the aggregate of the second type that is modified and the complementary aggregate of the second type for the network location, the processor proceeds to step 604. Otherwise, the processor proceeds to step 605.

In step 604, the processor removes data obtained from call detail records associated with the network location and labels the change in the service performance for the network location as a network-centric change in the service performance. In other words, the software upgrade is deemed to be a false co-occurring software upgrade. The processor then proceeds to step 612.

In step 605, the processor determines an impact of the software upgrade for the network location. The impact of the software upgrade for the network location may comprise an improvement in the service performance or a degradation in the service performance.

In step 608, the processor determines whether the impact of the software upgrade is determined for all network locations. When the impact of the software upgrade is determined for all network locations, the processor proceeds to step 609. Otherwise, the processor returns to step 603.

In step 609, the processor determines whether a difference between a number of network locations for which the impact of the software upgrade is an improvement in the service performance and a number of network locations for which the impact of the software upgrade is a degradation in the service performance is less than or equal to a predetermined threshold. When the difference is less than or equal to the predetermined threshold, the processor proceeds to step 610. Otherwise, the processor proceeds to step 611.

In step 610, the processor identifies the software upgrade as a false co-occurring software upgrade. In other words, the impact in the service performance that is observed is deemed to be due to an interaction between the mobile device and the network of the service provider. The processor then proceeds to step 612 to end the process.

In step 611, the processor infers that the software upgrade is the cause of the service performance. In other word, the software upgrade is a true co-occurring software upgrade. The processor then proceeds to step 612 to end the process. In other words, step 431 of method 400 or step 550 of method 500 uses the output of method 600.

The AS 112 of the preset disclosure is for performing the functions or operations of method 400, 500 or 600, as described above. In addition, although not specifically specified, one or more steps, functions or operations of method 400, 500 or 600 may include a storing, displaying and/or outputting step as required for a particular application. In other words, any data, records, fields, and/or intermediate results discussed in the method can be stored, displayed and/or outputted either on the device executing the method or to another device, as required for a particular application.

Furthermore, steps, blocks, functions or operations in FIG. 4, FIG. 5 or FIG. 6 that recite a determining operation or involve a decision do not necessarily require that both branches of the determining operation be practiced. In other words, one of the branches of the determining operation can be deemed as an optional step. Moreover, steps, blocks, functions or operations of the above described method 400, 500 or 600 can be combined, separated, and/or performed in a different order from that described above, without departing from the example embodiments of the present disclosure.

As such, the present disclosure provides at least one advancement in the technical field of determining the impact of a software upgrade implemented on a user endpoint device on a service performance. For instance, in one example, the present disclosure provides an AS that obtains call detail records of a plurality of mobile user endpoint devices, aggregates each mobile user endpoint device of the plurality of mobile user endpoint devices into at least one group that is established for assessing a service performance. In doing so, the AS is able to ascertain whether a software upgrade attributable to a type of network to which the mobile user endpoint device attaches, a make of the mobile user endpoint device, a model of the mobile user endpoint device, and/or a version of software installed in the mobile user endpoint device is the underlying cause to an impact to a service performance. The network service provider may then take a remedial action based on the inference that the software upgrade has caused the impact to the service performance. In one example, the network service provider may notify manufacturers of mobile user endpoint devices regarding an improvement or a degradation of service performance due to a software upgrade put forth by the manufacturers. In another example, the network service provider may notify users of mobile user endpoint devices regarding an improvement or a degradation of service performance due to a software upgrade put forth by the manufacturers of their mobile user endpoint devices.

Figure 7:
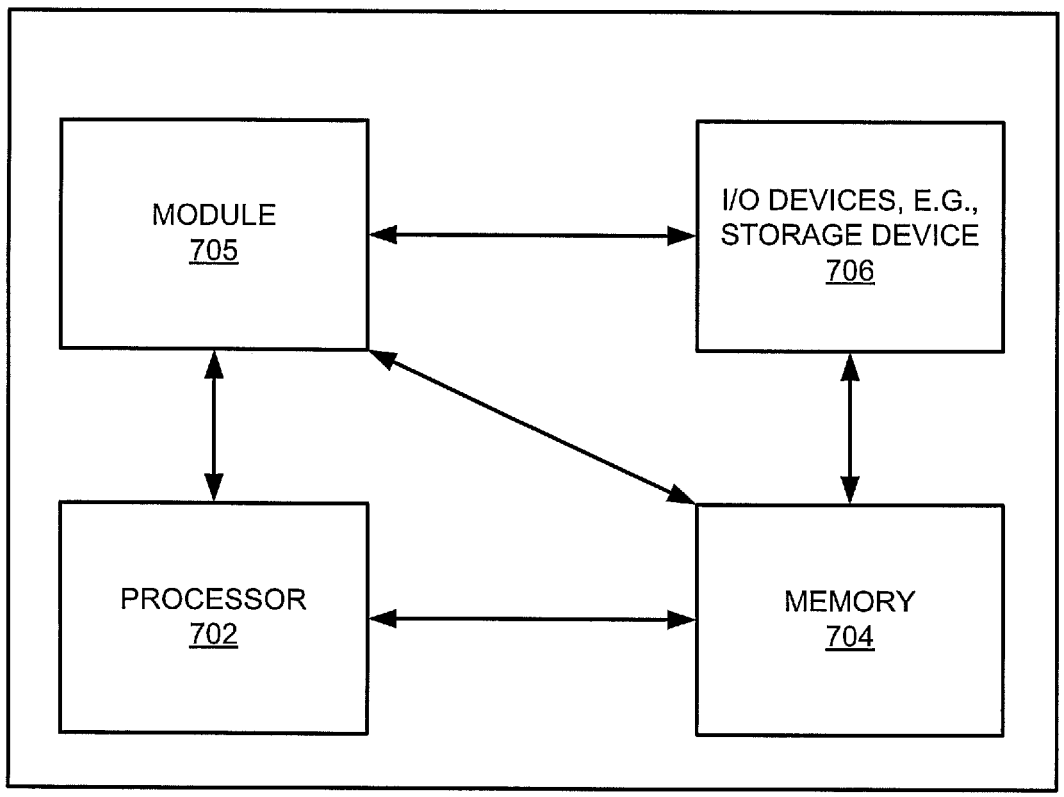
FIG. 7 depicts a high-level block diagram of a computer suitable for use in performing the functions described herein.

FIG. 7 depicts a high-level block diagram of a computer suitable for use in performing the functions described herein. As depicted in FIG. 7, the system 700 comprises one or more hardware processor elements 702 (e.g., a central processing unit (CPU), a microprocessor, or a multi-core processor), a memory 704, e.g., random access memory (RAM) and/or read only memory (ROM), a module 705 for determining the impact of a software upgrade to a network connected user endpoint device on a service performance, and various input/output devices 706 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method 400, 500 or 600 as discussed above is implemented in a distributed or parallel manner for a particular illustrative example, i.e., the steps of the above method 400, 500 or 600, or each of the entire method 400, 500 or 600 is implemented across multiple or parallel computers, then the computer of this figure is intended to represent each of those multiple computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computer or any other hardware equivalents, e.g., computer readable instructions pertaining to the method(s) discussed above can be used to configure a hardware processor to perform the steps, functions and/or operations of the above disclosed method.

In one embodiment, instructions and data for the present module or process 705 for determining the impact of a software upgrade to a user endpoint device on a service performance (e.g., a software program comprising computer-executable instructions) can be loaded into memory 704 and executed by hardware processor element 702 to implement the steps, functions or operations as discussed above in connection with the illustrative method 400, 500 or 600. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 705 for determining the impact of a software upgrade to a network connected user endpoint device on a service performance (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. An apparatus comprising:
   a processor of a communications network of a network service provider; and
   a computer-readable storage device storing a plurality of instructions which, when executed by the processor, cause the processor to perform operations, the operations comprising:
      obtaining call detail records associated with a plurality of mobile user endpoint devices from at least one network device deployed in the communications network of the network service provider;
      aggregating each mobile user endpoint device of the plurality of mobile user endpoint devices into at least one group, wherein each group of the at least one group is established based on at least one of: a type of each mobile user endpoint device, a make of each mobile user endpoint device, a model of each mobile user endpoint device, or a version of a software deployed on each mobile user endpoint device, wherein the type, the make, the model, and the version of the software are obtained from a respective call detail record associated with each mobile user endpoint device;
      mapping each mobile user endpoint device of the plurality of mobile user endpoint devices to at least one first aggregate, wherein each aggregate of the at least one first aggregate comprises at least one of: a group established based on the type of each of the mobile user endpoint devices, a group established based on the make of each of the mobile user endpoint devices, or a group established based on the model of each of the mobile user endpoint devices;
      mapping each mobile user endpoint device of the plurality of mobile user endpoint devices to at least one second aggregate, wherein each aggregate of the at least one second aggregate comprises a group established based on a version of software deployed on the mobile user endpoint devices and at least one of: the group established based on the type of the mobile user endpoint devices, the group established based on the make of the mobile user endpoint devices, and the group established based on the model of the mobile user endpoint devices;
      identifying, for the at least one first aggregate, a nearest co-occurring software upgrade when a change in a service performance in the communications network is detected based on the at least one first aggregate, wherein the identifying is further based on a penetration rate for the version of software associated with the at least one second aggregate reaching a predetermined threshold for the penetration rate; and
      determining the nearest co-occurring software upgrade comprises a true co-occurring software upgrade, wherein the determining the nearest co-occurring software upgrade comprises the true co-occurring software upgrade comprises:
         modifying the at least one second aggregate by including network location information for each mobile user endpoint device of the plurality of mobile user endpoint devices;
         determining, for at least one network location, whether a same change in the service performance is detected for the at least one second aggregate that is modified and for a complementary aggregate for the at least one second aggregate, wherein the complementary aggregate is an aggregate for mapping mobile user endpoint devices that are mapped to the at least one first aggregate and are not mapped to the at least one second aggregate that is modified;
         determining, when the same change in the service performance is not detected for the at least one network location, an impact of the nearest co-occurring software upgrade for the at least one network location;
         determining whether a difference between a number of network locations of the at least one network location for which the impact of the nearest co-occurring software upgrade is an improvement in the service performance and a number of network locations of the at least one network location for which the impact of the nearest co-occurring software upgrade is a degradation in the service performance is less than or equal to a predetermined threshold for the difference; and
         determining, when the difference is greater than the predetermined threshold for the difference, that the nearest co-occurring software upgrade is a cause of the change of the service performance; and
      determining that the nearest co-occurring software upgrade is the cause for the change in the service performance that is detected.

2. The apparatus of claim 1, wherein the nearest co-occurring software upgrade comprises a software upgrade that occurred within a predetermined time window bounding a time when the change in the service performance is detected.

3. The apparatus of claim 2, wherein the software upgrade that occurred within the predetermined time window bounding the time when the change in the service performance is detected further comprises a software upgrade that occurred closest to the time when the change in the service performance is detected.

4. The apparatus of claim 2, the operations further comprising:
   recording, based on the call detail records, the time when the change in the service performance is detected, a previous time relative to the time when the change in the service performance is detected, and a subsequent time relative to the time when the change in the service performance is detected.

5. The apparatus of claim 1, the operations further comprising:
recording a statistical measure of the change in the service performance that is detected.

6. The apparatus of claim 5, wherein the statistical measure of the change in the service performance comprises at least one of: a mean of the change in the service performance, a median of the change in the service performance, and a standard deviation of the change in the service performance.

7. The apparatus of claim 1, the operations further comprising:
determining whether the change in the service performance that is detected comprises an improvement in the service performance or a degradation in the service performance.

8. The apparatus of claim 1, the operations further comprising:
providing a notification indicating that the change in the service performance is detected and that the nearest co-occurring software upgrade is inferred as being the cause for the change in the service performance.

9. The apparatus of claim 8, wherein the notification further includes an identification of the nearest co-occurring software upgrade.

10. The apparatus of claim 1, wherein the change in the service performance is detected when the change in the service performance is greater than a predetermined threshold that is established for the at least one first aggregate.

11. The apparatus of claim 1, wherein the call detail records are obtained in accordance with a predetermined time interval.

12. The apparatus of claim 11, wherein the network service provider determines the predetermined time interval.

13. The apparatus of claim 1, wherein the determining that the nearest co-occurring software upgrade is the true co-occurring software upgrade comprises determining that the nearest co-occurring software upgrade is the cause of the change in the service performance.

14. A non-transitory computer-readable storage device storing a plurality of instructions which, when executed by a processor of a communications network of a network service provider, cause the processor to perform operations, the operations comprising:
obtaining call detail records associated with a plurality of mobile user endpoint devices from at least one network device deployed in the communications network of the network service provider;
aggregating each mobile user endpoint device of the plurality of mobile user endpoint devices into at least one group, wherein each group of the at least one group is established based on at least one of: a type of each mobile user endpoint device, a make of each mobile user endpoint device, a model of each mobile user endpoint device, or a version of a software deployed on each mobile user endpoint device, wherein the type, the make, the model, and the version of the software are obtained from a respective call detail record associated with each mobile user endpoint device;
mapping each mobile user endpoint device of the plurality of mobile user endpoint devices to at least one first aggregate, wherein each aggregate of the at least one first aggregate comprises at least one of: a group established based on the type of each of the mobile user endpoint devices, a group established based on the make of each of the mobile user endpoint devices, or a group established based on the model of each of the mobile user endpoint devices;
mapping each mobile user endpoint device of the plurality of mobile user endpoint devices to at least one second aggregate, wherein each aggregate of the at least one second aggregate comprises a group established based on a version of software deployed on the mobile user endpoint devices and at least one of: the group established based on the type of the mobile user endpoint devices, the group established based on the make of the mobile user endpoint devices, and the group established based on the model of the mobile user endpoint devices;
identifying, for the at least one first aggregate, a nearest co-occurring software upgrade when a change in a service performance in the communications network is detected based on the at least one first aggregate, wherein the identifying is further based on a penetration rate for the version of software associated with the at least one second aggregate reaching a predetermined threshold for the penetration rate; and
determining the nearest co-occurring software upgrade comprises a true co-occurring software upgrade, wherein the determining the nearest co-occurring software upgrade comprises the true co-occurring software upgrade comprises:
modifying the at least one second aggregate by including network location information for each mobile user endpoint device of the plurality of mobile user endpoint devices;
determining, for at least one network location, whether a same change in the service performance is detected for the at least one second aggregate that is modified and for a complementary aggregate for the at least one second aggregate, wherein the complementary aggregate is an aggregate for mapping mobile user endpoint devices that are mapped to the at least one first aggregate and are not mapped to the at least one second aggregate that is modified;
determining, when the same change in the service performance is not detected for the at least one network location, an impact of the nearest co-occurring software upgrade for the at least one network location;
determining whether a difference between a number of network locations of the at least one network location for which the impact of the nearest co-occurring software upgrade is an improvement in the service performance and a number of network locations of the at least one network location for which the impact of the nearest co-occurring software upgrade is a degradation in the service performance is less than or equal to a predetermined threshold for the difference;
determining, when the difference is greater than the predetermined threshold for the difference, that the nearest co-occurring software upgrade is a cause of the change of the service performance; and
determining that the nearest co-occurring software upgrade is the cause for the change in the service performance that is detected.

15. The non-transitory computer-readable storage device of claim 14, wherein the nearest co-occurring software upgrade comprises a software upgrade that occurred within a predetermined time window bounding a time when the change in the service performance is detected.

16. The non-transitory computer-readable storage device of claim 15, wherein the software upgrade that occurred within the predetermined time window bounding the time when the change in the service performance is detected further comprises a software upgrade that occurred closest to the time when the change in the service performance is detected.

17. The non-transitory computer-readable storage device of claim 15, the operations further comprising:
    recording, based on the call detail records, the time when the change in the service performance is detected, a previous time relative to the time when the change in the service performance is detected, and a subsequent time relative to the time when the change in the service performance is detected.

18. The non-transitory computer-readable storage device of claim 14, the operations further comprising:
    recording a statistical measure of the change in the service performance that is detected.

19. The non-transitory computer-readable storage device of claim 18, wherein the statistical measure of the change in the service performance comprises at least one of: a mean of the change in the service performance, a median of the change in the service performance, and a standard deviation of the change in the service performance.

20. A method comprising:
    obtaining, by a processor of a communications network of a network service provider, call detail records associated with a plurality of mobile user endpoint devices from at least one network device deployed in the communications network of the network service provider;
    aggregating, by the processor, each mobile user endpoint device of the plurality of mobile user endpoint devices into at least one group, wherein each group of the at least one group is established based on at least one of: a type of each mobile user endpoint device, a make of each mobile user endpoint device, a model of each mobile user endpoint device, or a version of a software deployed on each mobile user endpoint device, wherein the type, the make, the model, and the version of the software are obtained from a respective call detail record associated with each mobile user endpoint device;
    mapping, by the processor, each mobile user endpoint device of the plurality of mobile user endpoint devices to at least one first aggregate, wherein each aggregate of the at least one first aggregate comprises at least one of: a group established based on the type of each of the mobile user endpoint devices, a group established based on the make of each of the mobile user endpoint devices, or a group established based on the model of each of the mobile user endpoint devices;
    mapping, by the processor, each mobile user endpoint device of the plurality of mobile user endpoint devices to at least one second aggregate, wherein each aggregate of the at least one second aggregate comprises a group established based on a version of software deployed on the mobile user endpoint devices and at least one of: the group established based on the type of the mobile user endpoint devices, the group established based on the make of the mobile user endpoint devices, and the group established based on the model of the mobile user endpoint devices;
    identifying, by the processor for the at least one first aggregate, a nearest co-occurring software upgrade when a change in a service performance in the communications network is detected based on the at least one first aggregate, wherein the identifying is further based on a penetration rate for the version of software associated with the at least one second aggregate reaching a predetermined threshold for the penetration rate; and
    determining, by the processor, the nearest co-occurring software upgrade comprises a true co-occurring software upgrade, wherein the determining the nearest co-occurring software upgrade comprises the true co-occurring software upgrade comprises:
        modifying, by the processor, the at least one second aggregate by including network location information for each mobile user endpoint device of the plurality of mobile user endpoint devices;
        determining, by the processor for at least one network location, whether a same change in the service performance is detected for the at least one second aggregate that is modified and for a complementary aggregate for the at least one second aggregate, wherein the complementary aggregate is an aggregate for mapping mobile user endpoint devices that are mapped to the at least one first aggregate and are not mapped to the at least one second aggregate that is modified;
        determining, by the processor when the same change in the service performance is not detected for the at least one network location, an impact of the nearest co-occurring software upgrade for the at least one network location;
        determining, by the processor, whether a difference between a number of network locations of the at least one network location for which the impact of the nearest co-occurring software upgrade is an improvement in the service performance and a number of network locations of the at least one network location for which the impact of the nearest co-occurring software upgrade is a degradation in the service performance is less than or equal to a predetermined threshold for the difference;
        determining, by the processor when the difference is greater than the predetermined threshold for the difference, that the nearest co-occurring software upgrade is a cause of the change of the service performance; and
    determining, by the processor, that the nearest co-occurring software upgrade is the cause for the change in the service performance that is detected.

* * * * *